(12) United States Patent
Kroeger et al.

(10) Patent No.: US 6,430,227 B1
(45) Date of Patent: Aug. 6, 2002

(54) FM IN-BAND-ON-CHANNEL DIGITAL AUDIO BROADCASTING METHOD AND SYSTEM

(75) Inventors: Brian William Kroeger, Sykesville; Denise Maureen Cammarata, Owings Mills; Richard Edward Martinson, Sykesville; Jeffrey Scott Baird, Columbia; Paul James Peyla, Elkridge, all of MD (US); E. Glynn Walden, Marlton, NJ (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 09/049,210

(22) Filed: Mar. 27, 1998

(51) Int. Cl.[7] .......................... H04L 27/28; H04L 27/04; H04L 27/06
(52) U.S. Cl. ........................ 375/260; 375/295; 375/316
(58) Field of Search ................................ 375/260, 259, 375/316, 295; 381/2–10; 370/206, 208

(56) References Cited

U.S. PATENT DOCUMENTS

| | | | | |
|---|---|---|---|---|
| 5,425,050 A | * | 6/1995 | Schreiber et al. | 375/130 |
| 5,588,022 A | * | 12/1996 | Dapper et al. | 375/260 |
| 5,764,706 A | * | 6/1998 | Carlin et al. | 375/260 |
| 5,949,796 A | | 9/1999 | Kumar | |
| 5,949,813 A | * | 9/1999 | Hunsinger et al. | 375/260 |

FOREIGN PATENT DOCUMENTS

WO   9749207   12/1997

OTHER PUBLICATIONS

C. Papadopoulos et al., "Simultaneous Broadcasting of Analog FM & Digital Audio Signals by Means of Adaptive Recancel Tech," IEEE Tran. on Comm. pp 1233–1242, 1998.*

W. Kroeger et al., "Compatability of FM Hybrid In–Band On–Channel (IBOC) System for Digital Audio Broadcasting," IEEE transactions on Broadcasting, pp. 421–430, 1997.*

Cupo, R.L., et al., "An OFDM All Digital In–Band–On–Channel (IBOC) AM and FM Radio Solution Using the PAC Encodes," *IEEE Transaction on Broadcasting*, pp. 22–27, Mar. 1998, vol. 44, No. 1, Copyright 1998.

* cited by examiner

*Primary Examiner*—Tesfaldet Bocure
(74) *Attorney, Agent, or Firm*—Robert P. Lenart; Pietragallo, Bosick & Gordon

(57) ABSTRACT

This invention provides a method of broadcasting including the steps of providing a broadcast signal in a central frequency band of an FM radio channel; providing a first plurality of sub-carriers in an upper sideband of the FM radio channel; providing a second plurality of sub-carriers in a lower sideband of the FM radio channel; modulating a first group of the first plurality of sub-carriers with a complementary punctured convolution coded encoded version of program material; modulating a first group of the second plurality of sub-carriers with the complementary punctured convolution coded version of the program material; and transmitting the broadcast signal, the first group of the first plurality of sub-carriers and the first group of the second plurality of sub-carriers. In an all-digital version of the invention, the central frequency band may include a plurality of sub-carriers transmitted at a lower power level than that of the sub-carriers in the upper and lower sidebands. These additional sub-carriers can be used to transmit additional data. Transmitters and receivers which utilized the method are also included.

64 Claims, 4 Drawing Sheets

FM IN-BAND-ON-CHANNEL DIGITAL AUDIO BROADCASTING METHOD AND SYSTEM

BACKGROUND OF THE INVENTION

This invention relates to radio broadcasting, and more particularly, to modulation formats for FM In-Band-On-Channel (IBOC) Digital Audio Broadcasting (DAB) and broadcasting systems utilizing such modulation formats.

Digital Audio Broadcasting is a medium for providing digital-quality audio, superior to existing analog broadcasting formats. FM IBOC DAB can be transmitted in a hybrid format where the digitally modulated signal coexists with the currently broadcast analog FM signal. IBOC requires no new spectral allocations because each DAB signal is simultaneously transmitted within the spectral mask of an existing FM channel allocation. IBOC promotes economy of spectrum while enabling broadcasters to supply digital quality audio to their present base of listeners. FM IBOC broadcasting systems have been the subject of several United States patents including U.S. Pat. Nos. 5,465,39; 5,315,583; 5,278,844 and 5,278,826. In addition, U.S. Pat. No. 5,956,624 for a "Method and System for Simultaneously Broadcasting and Receiving Digital and Analog Signals, by D. Kumar and B. Hunsinger, discloses an FM IBOC DAB system.

The advantages of digital transmission for audio include better signal quality with less noise and wider dynamic range than with existing FM radio channels. Initially the hybrid format would be adopted allowing the existing receivers to continue to receive the analog FM signal while allowing new IBOC receivers to decode the digital signal. Some time in the future, when IBOC DAB receivers are abundant, broadcasters may elect to transmit an all-digital format. The goal of FM hybrid IBOC DAB is to provide virtual-CD-quality stereo digital audio (plus data) while simultaneously transmitting the existing FM signal. The goal of FM all-digital IBOC DAB is to provide virtual-CD-quality stereo audio along with a data channel with capacity of up to about 200 kbps, depending upon a particular station's interference environment.

Since there is expected to be a transition from hybrid to all-digital IBOC DAB formats, it would be desirable to devise a modulation format that can be used by both systems so that the transition can be made with minimal changes in transmitting equipment.

SUMMARY OF THE INVENTION

This invention provides a method of broadcasting comprising the steps of: providing a broadcast signal in a central frequency band of an FM radio channel; providing a plurality of upper sideband sub-carriers in an upper sideband of the FM radio channel, with the upper sideband lying within a frequency band extending from about +100 kHz to about +200 kHz from the center frequency of the radio channel; providing a plurality of lower sideband sub-carriers in a lower sideband of the FM radio channel, with the lower sideband lying within a frequency band extending from about −100 kHz to about −200 kHz of the center frequency of the radio channel; orthogonal frequency division modulating a first group of the plurality of upper sideband sub-carriers with a complementary punctured convolution coded version of a program to be transmitted; orthogonal frequency division multiplexing the plurality of lower sideband sub-carriers with the complementary punctured convolution coded version of the program signal to be transmitted; and transmitting the central frequency band signal, the plurality of upper sideband sub-carriers, and the plurality of lower sideband sub-carriers.

When operating with a hybrid modulation format, the central frequency band signal comprises a carrier FM modulated by an analog program signal. When operating with an all-digital modulation format, the central frequency band signal comprises a third plurality of sub-carriers modulated by a digital signal and broadcast at an average power spectral density less than that of the upper sideband and lower sideband sub-carriers.

In the all-digital format, this invention includes a method of broadcasting comprising the steps of: providing a first plurality of sub-carriers in an upper sideband of an FM radio channel; providing a second plurality of sub-carriers in a lower sideband of said FM radio channel; orthogonally frequency division modulating a first group of said first plurality of sub-carriers with a digitally coded version of program signal to be transmitted; orthogonally frequency division modulating a first group of said second plurality of sub-carriers with said digitally coded version of said program signal to be transmitted; providing a third plurality of sub-carriers in a central frequency band of said FM radio channel, wherein the power spectral density of the third plurality of sub-carriers is less than the power spectral density of the sub-carriers in the upper and lower'sidebands; and transmitting said first group of said first plurality of sub-carriers, said first group of said second plurality of sub-carriers, and said third plurality of sub-carriers.

The invention also encompasses transmitters and receivers that utilize the above methods.

This invention provides a modulation format that can be used by both hybrid and all-digital in-band-on-channel digital audio broadcasting systems so that the transition can be made with minimal changes in transmitting equipment.

DESCRIPTION OF THE PREFERRED EMBODIMENTS

Figure 1:
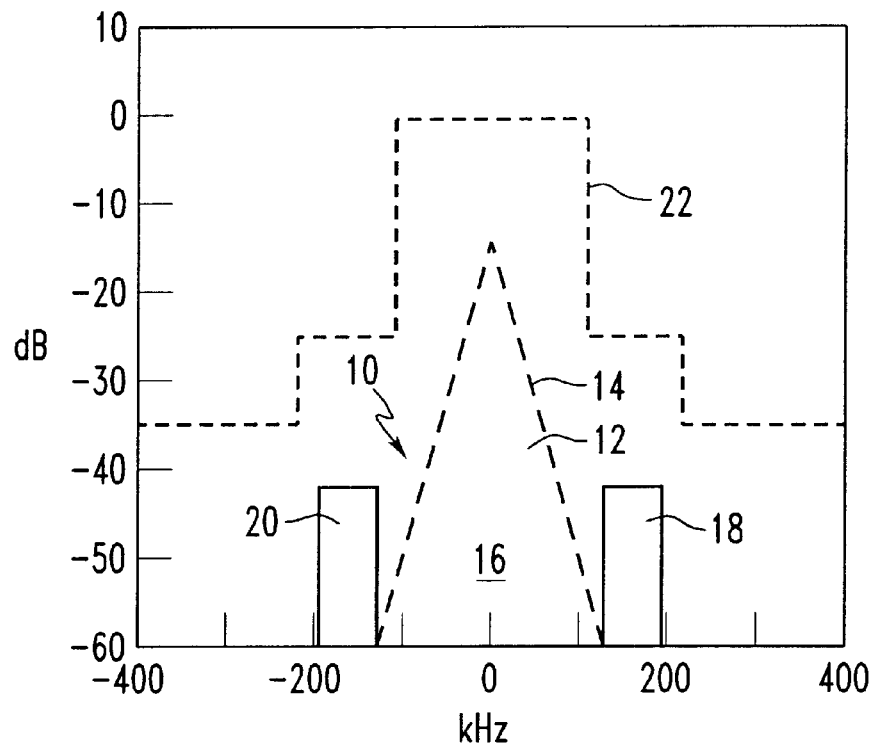
FIG. 1 is a schematic representation of the frequency allocations and relative power spectral density of the signal components for a hybrid FM IBOC DAB signal in accordance with the present invention.

Referring to the drawings, FIG. 1 is a schematic representation of the frequency allocations (spectral placement)

and relative power spectral density of the signal components for a hybrid FM IBOC DAB signal 10 in accordance with the present invention. The hybrid format includes the conventional FM stereo analog signal 12 having a power spectral density represented by the triangular shape 14 positioned in a central, or central frequency band, 16 portion of the channel. The Power Spectral Density (PSD) of a typical analog FM broadcast signal is nearly triangular with a slope of about −0.35 dB/kHz from the center frequency. A plurality of digitally modulated evenly spaced sub-carriers are positioned on either side of the analog FM signal, in an upper sideband 18 and a lower sideband 20, and are transmitted concurrently with the analog FM signal. All of the carriers are transmitted at a power level that falls within the United States Federal Communications Commission channel mask 22. The vertical axis in FIG. 1 shows the peak power spectral density as opposed to a more conventional average power spectral density characterization, In this case, the total one-sided DAB signal power is 25 dB below the FM carrier power while the peak spectral power ratio appears significantly greater. The short-term FM spectrum is more "peaky" than the short-term DAB spectrum when both are observed in a 1 kHz bandwidth. As will be seen from the description below, the digitally modulated portion of the hybrid signal is a subset of the all-digital DAB signal that will be transmitted in the all-digital IBOC DAB format.

Signals from an adjacent FM channel (i.e. the first adjacent FM signals), if present, would be centered at a spacing of 200 kHz from the center of the channel of interest. In one embodiment of the invention, referred to as the hybrid FM IBOC modulation format, 95 evenly spaced orthogonal frequency division modulated (OFDM) sub-carriers are placed on each side of the host analog FM signal occupying the spectrum from about 129 kHz through 198 kHz away from the host FM center frequency as illustrated by the upper sideband 18 and the lower sideband 20 in FIG. 1. In the hybrid system the total DAB power in the OFDM modulated sub-carriers in each sideband is set to about −25 dB relative to its host analog FM power.

Figure 2:
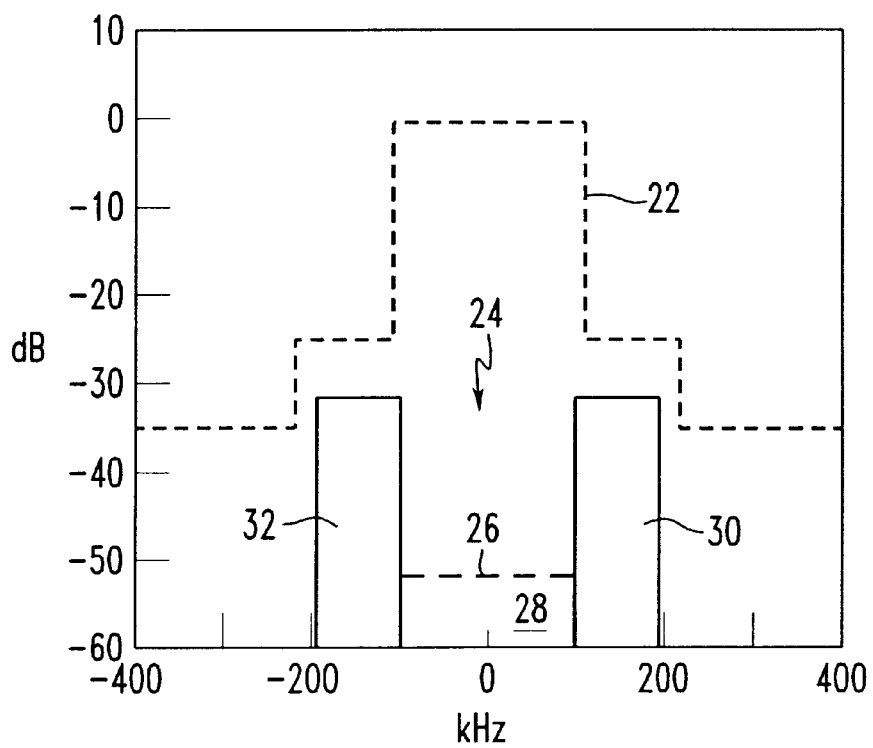
FIG. 2 is a schematic representation of the frequency allocations and relative power spectral density of the signal components for an all-digital FM IBOC DAB signal in accordance with the present invention.

The spectral placement and relative signal power density levels of the OFDM digital sub-carriers in a second embodiment of the invention, referred to as the all-digital FM DAB format illustrated by item number 24, is shown in FIG. 2. In this embodiment of the invention, the analog FM signal has been replaced by an optional additional group of OFDM sub-carriers, referred to as the extended all-digital signal 26, located in the central frequency band 28. Once again evenly spaced OFDM sub-carriers are positions in an upper sideband 30 and a lower sideband 32. The sidebands of the all-digital format of FIG. 2 are wider than the sidebands of FIG. 1. In addition, the power spectral density level of the all-digital IBOC signal sidebands is set about 10 dB higher than that allowed in the hybrid IBOC sidebands. This provides the all-digital IBOC signal with a significant performance advantage. Furthermore the power spectral density of the extended all-digital signal is about 15 dB below that of the hybrid IBOC sidebands. This minimizes or eliminates any interference problems to adjacent hybrid or all-digital IBOC signals while providing additional capacity for other digital services.

It is recommended that the extended data sub-carriers be set at a relative level of roughly 15 dB below the level of the other main sub-carriers. This is a compromise between the robustness of these extended sub-carriers and interference to the main sub-carriers of a first adjacent signal. To assess the potential interference situation, assume that the maximum relative level of the first adjacent all-digital station is −6 dB at the 54 dBu protected contour. This is the case for the pair of first-adjacent stations that meet the FCC guidelines, although there are exceptions that are close-spaced. The extended data sub-carriers would interfere with the first adjacent main sub-carriers at a relative level of −21 dB (−6 dB−15 dB). This level of interference includes some margin for fading and should not result in significant degradation of the main signal. However, the extended data sub-carriers would suffer when the first adjacent interferer is −6 dB lower since the interferer's main sub-carriers would be 9 dB higher than the extended data sub-carriers. FEC coding would be imposed upon the extended data sub-carriers such that one first adjacent interferer can be tolerated. If the extended data is perceived to be more valuable than indicative of the protection provided, then consider raising the level of the extended data sub-carriers to −10 dB instead of −15 dB.

Figure 3:
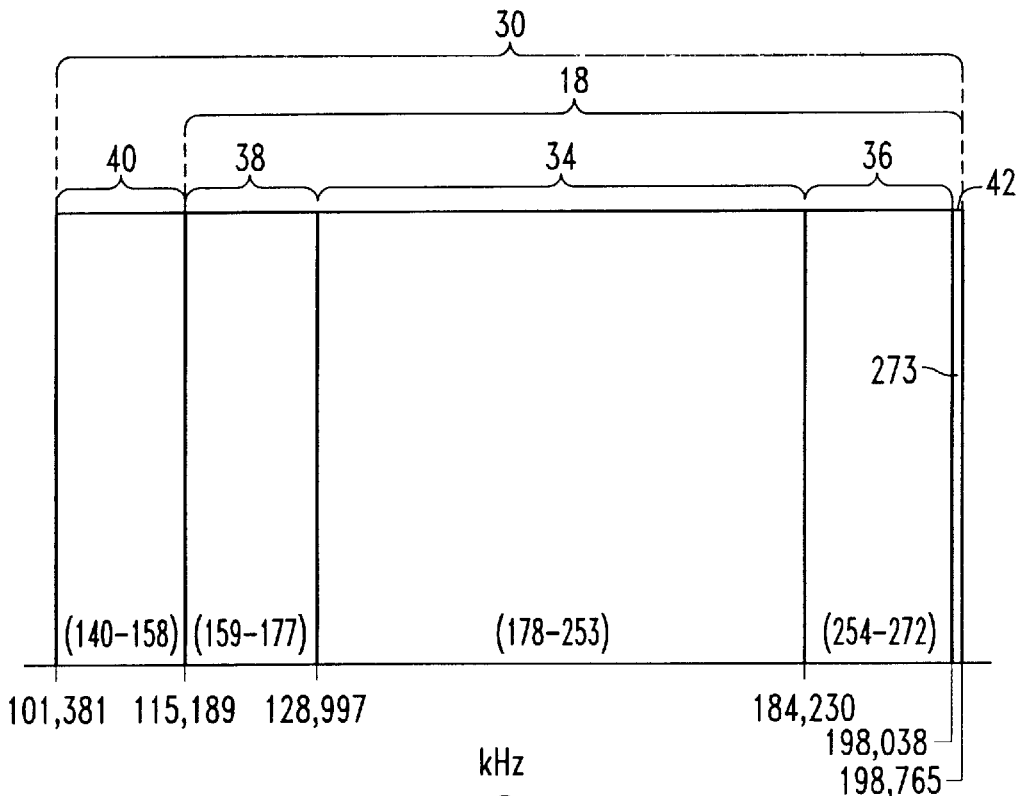
FIG. 3 is a schematic representation of the frequency allocations and relative power spectral density of the signal components for the upper sideband of the FM IBOC DAB signal in accordance with the present invention.
Figure 4:
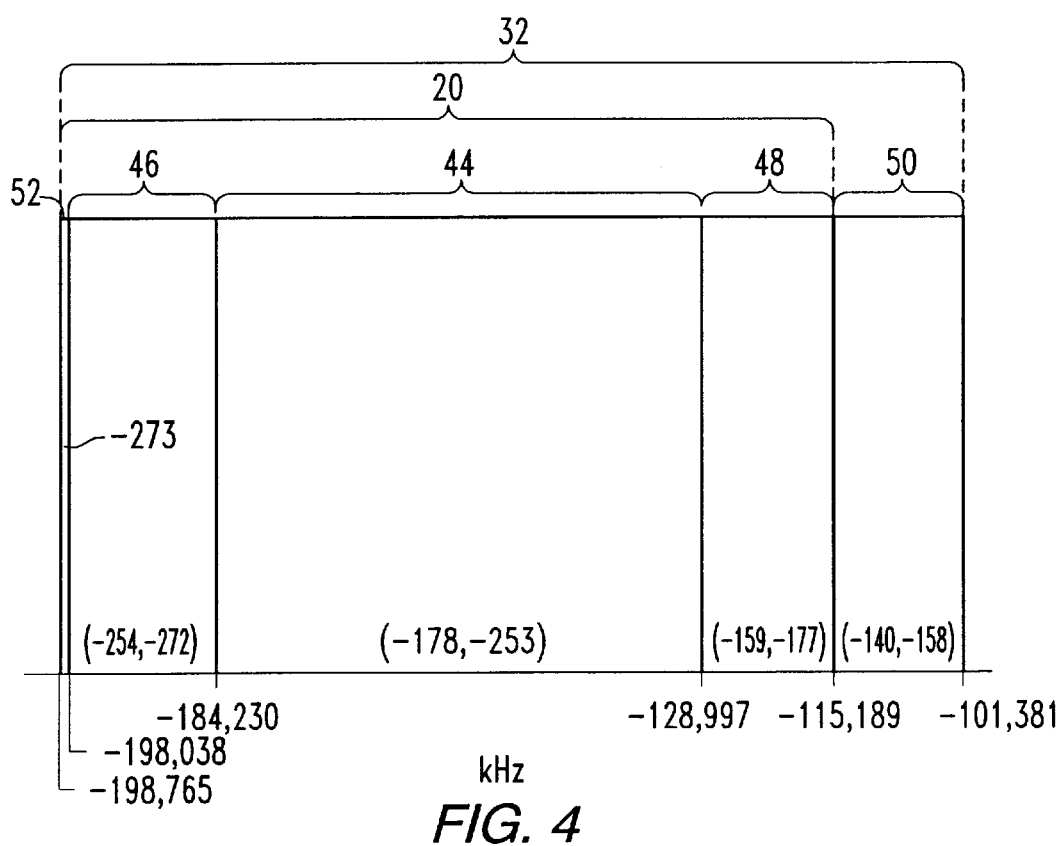
FIG. 4 is a schematic representation of the frequency allocations and relative power spectral density of the signal components for the lower sideband of the FM IBOC DAB signal in accordance with the present invention.

FIG. 3 is a schematic representation of the placement and relative power spectral density of the signal components for the upper sideband of FM IBOC DAB signal in accordance with the present invention. In FIGS. 3 and 4, the potential sub-carrier locations are indexed (assigned numbers) ranging from zero at the FM center frequency to plus or minus 273 at the edges of the 400 kHz bandwidth, with the positive assignments having carrier frequencies above the channel center frequency and the negative numbers having frequencies below the channel center frequency. The sub-carrier assignments shown in parentheses above the frequency scale FIG. 3 include all optional sub-carriers in the upper sideband of both the hybrid and all-digital systems. The hybrid DAB sub-carriers comprise a subset of the all-digital DAB sub-carriers. In the preferred embodiments of the invention, the individual OFDM sub-carriers are QPSK modulated at 689.0625 Hz (44100/64) and are orthogonally spaced at about 726.7456055 Hz (44100*135/8192) after pulse shaping is applied (root raised cosine time pulse with 7/128 excess time functions as guard time). The frequency scale shows the frequency difference from the channel center frequency.

The upper sideband represented in FIG. 3, is comprised of information-bearing sub-carriers 140 through 272 corresponding to sub-carrier frequencies 101,744 Hz through 197,675 Hz. Sub-carrier 273 is an optional reference sub-carrier. The upper sideband is shown to be divided into several groups 34, 36, 38 and 40. Group 34 represents the main channel and contains sub-carriers 178 through 253. The main channel sub-carriers are used to transmit the program material to be broadcast in the form of data bits of the coding algorithm at a rate of at least 96 thousand bits per second (kbs). The main channel may include ancillary and auxiliary data. A second group of carriers 36 occupying sub-carrier positions 254 through 272 are used to transmit parity bits. A third group of carriers can be used to carry a 24 kbps delayed version of the program material for tunings and backup purposes. As will be discussed below, these sub-carriers are more likely to be corrupted by interferers than sub-carriers that are positioned closer to the center of the channel. The most expendable code bits are placed on the outer OFDM sub-carriers. The expendable bits contribute least to the free distance or coding gain of the combined code and they are least important to the error correction ability of the code. Therefore, the most vulnerable sub-carriers are used to carry these expendable bits.

Another group of sub-carriers 38 is used in the all-digital embodiment of the invention to carry parity bits or optional data and may be used in the hybrid embodiment of the invention, if the analog signal in the central frequency band is scaled back, for example by removing stereo information.

Sub-carrier group 40 includes sub-carrier positions 140 through 158 and is used in the all-digital embodiment to transmit a delayed backup version of the program material at a lower data rate, of for example 24 kbs. The sub-carriers in this group would not be used in the hybrid embodiment unless the analog base band signal is further scaled back. In the all-digital embodiment, the sub-carriers of group 40 provide data that can be used in the event of a loss of the signal transmitted in the main channel. The sub-carrier at location 273 represents an optional reference signal 42. This signal may be used for signal acquisition purposes if desired.

The lower sideband shown in FIG. 4, has a mirror image of the upper sideband format with negative indexes and frequencies. Lower sideband main channel 44 contains the sub-carriers at locations −178 through −253 and is used to transmit the same program material as is transmitted in the upper sideband main channel. The sub-carriers in groups 46, 48 and 50 are utilized in the same manner as the sub-carriers of groups 36, 38 and 40 of the upper sideband. The sub-carrier in position −273 may be used to transmit an optional reference signal. The sub-carriers in both sidebands use orthogonal frequency division multiplexing and are FEC coded using Complementary Punctured Convolution (CPC) codes. CPC codes are known in the art, for example, see S. Kallel, "Complementary Punctured Convolution (CPC) Codes and Their Applications," IEEE Trans. Commn., Vol. 43, No. 6, pp. 2005–2009, June, 1995.

The reference sub-carriers, if used, are located at plus or minus 273 with center frequencies of plus or minus 198,402 Hz. The reference sub-carriers would be modulated with the same symbol phase used to modulate sub-carrier 272 for the previous symbol time. This allows the receiver the option of performing differential detection in frequency starting with the reference sub-carrier, or differential detection in frequency starting with the time differential detection of sub-carrier 272. Ideally, in the absence of interference, but with fading, performance may be better using the reference sub-carrier. However, it may be advantageous to eliminate the reference sub-carrier to minimize potential interference from a second adjacent DAB signal.

The 96 kbps PAC main channel occupying sub-carriers 178 through 253 is formatted identically in both the hybrid and all-digital systems. This main channel is coded over both DAB sidebands using CPC codes, resulting in a rate ½ CPC code. The reference sub-carrier, if used, would also be identical in both hybrid and all-digital systems. These reference (pilot) sub-carriers may be modulated with an alternating sequence to permit assistance in frequency and symbol timing acquisition and tracking. The preferred embodiment of this invention uses a perceptual audio coding (PAC) algorithm. Perceptual audio coding algorithms have been the subject of numerous U. S. Pat. Nos. 5,481,614; 5,285,498 and 5,040,217. However, it should be understood that this invention is not limited to the use of perceptual audio coding algorithms.

Sub-carriers 254 through 272 (upper and lower sidebands) carry either additional parity bits for the CPC code, or data in both hybrid and all-digital systems. The transmission of parity bits here improves the FEC code rate over the main channel from R=½ to R=⅖, or R=⅘ on each sideband independently. In the presence of adjacent channel FM interference, these outer OFDM sub-carriers are most vulnerable to corruption, and the interference on the upper and lower sidebands is independent. Since the PSD of an FM broadcast signal is nearly triangular, then the interference increases as the OFDM sub-carriers approach the frequency of a first adjacent signal. When parity bits are transmitted, the coding and interleaving may be specially tailored to deal with this nonuniform interference such that the communication of information is robust.

Sub-carriers 159 through 177 in group 38 of the upper sideband and sub-carriers −159 through −177 in group 48 of the lower sideband can carry either additional parity bits for the CPC code, or data. This selection is optional in the hybrid system, but mandatory in the all-digital system. The transmission of parity bits here improves the FEC code rate over the main channel from R=½ to R=⅖, or R=⅘ on each independent DAB sideband. If parity bits are transmitted in both regions 159 through 177 and 254 through 272 (and corresponding sub-carriers in the lower sideband), then the overall code rate is R=⅓, or R=⅔ on each independent DAB sideband.

The IBOC DAB system will transmit all the digital audio information on each DAB sideband (upper or lower) of the FM carrier. Although additional sub-carriers beyond the baseline system can be activated to enable the transmission of all the code bits of the rate ⅓ FEC code, the baseline system employs a code rate of ⅖. Each sideband can be detected and decoded independently with an FEC coding gain achieved by a rate ⅘ (optionally rate ⅔) convolutional code. This redundancy permits operation on one sideband while the other is corrupted. However, usually both sides are combined to provide additional signal power and coding gain commensurate with a rate ⅖ (optionally rate ⅓) code. Furthermore special techniques can be employed to demodulate and separate strong first adjacent interferers such that a "recovered" DAB sideband can supplement the opposite sideband to improve coding gain and signal power over any one sideband.

The all-digital system will utilize sub-carriers 140 through 158 in group 40 of the upper sideband and sub-carriers −140 through −158 of the lower sideband to carry a lower data rate version of the data in the main channel, e.g. 24 kbps embedded PAC code. This lower rate backup data is delayed to enhance performance using time diversity. This backup data of the all-digital system replaces the analog FM blend of the hybrid system which is described in commonly owned co-pending application "A System And Method For Mitigating Intermittent Interruption In An Audio Radio Broadcast System", filed Oct. 9, 1997, U.S. Ser. No. 08/947,902. When the Main Channel data is corrupted, the backup data can fill-in the audio segment. Since the backup data is comprised of an embedded subset of the main channel data bits, the backup can enable additional error protection for the main channel.

In the all-digital embodiment, sub-carriers from index −139 to 139 which are located in the central frequency band 28 in FIG. 2, can be used as an option to extend DAB capacity. The channel bit rate over this "extended" bandwidth without coding is about 384 kbps. Because half of this bandwidth can be corrupted by a first adjacent DAB signal, the CPC FEC coding technique should be applied to each half of the extended bandwidth, i.e. sub-carriers 1 through 139 should carry the same information as sub-carriers −1 through −139. Then, if either half becomes corrupted, there will still be a rate ⅔ complementary code on the remaining half. In this case, the information capacity after rate ⅓ coding is about 128 kbps.

The extended all-digital band is exposed to interference only from a first-adjacent hybrid or all-digital interferer. Under present protected contour guidelines, the maximum level of the first adjacent interferer is −6 dB relative to the host station. If this first adjacent interferer is an all-digital IBOC, then the interferer can be up to 14 dB higher than the level of that half of the extended band. The extended band starts to positively contribute to the coding gain when the spectral density of the interferer is about the same level as the extended band signal. This implies that an all-digital first adjacent interferer must be at least 20 dB below the signal of interest (20 dB di/du) before that half of the extended band is useful. Reception of the extended data might be possible with both first adjacents present at −20 dB; however robust reception in fading probably requires at least one first adjacent at −30 dB or lower.

Consider the possibility of raising the level of the extended band as high as the hybrid DAB sideband levels. The extended band interference to a first-adjacent hybrid is then only −6 dB at the 54 dBu contour. Similarly the interference to an all-digital first-adjacent signal is −16 dB. While the coverage area and robustness of the extended region are not as good as the all-digital sidebands, acceptable levels of performance should be achievable within the normal protected contour, except in areas where both first adjacent signals are significant. Possible uses of the extended all-digital bandwidth are surround-sound, slow-scan video, datacasting, etc. These extended services can be received where available.

Figure 5:
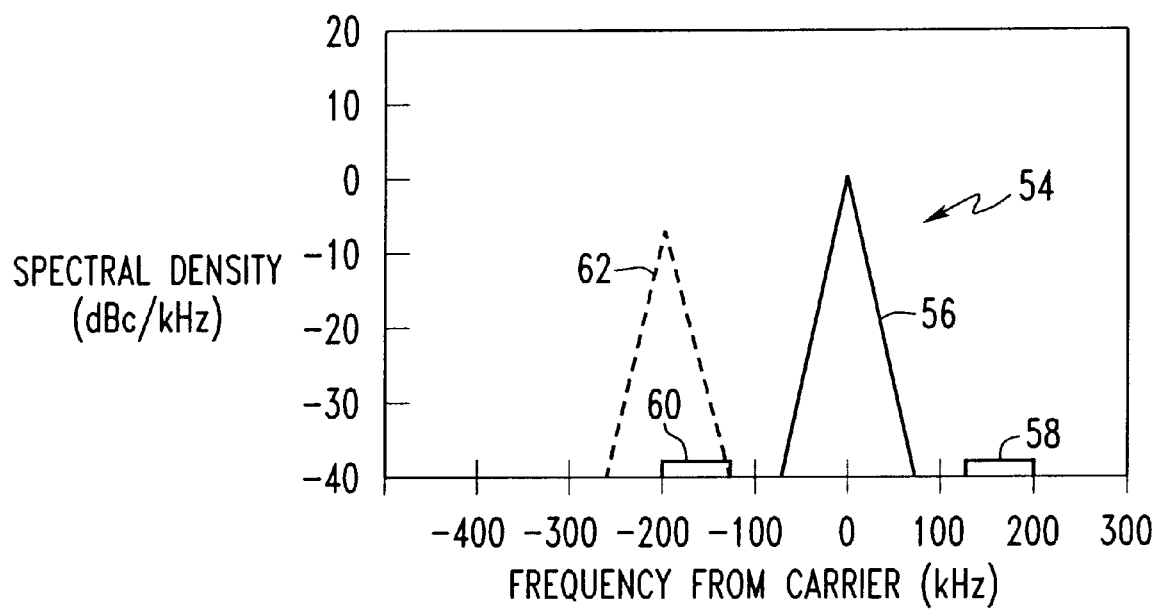
FIG. 5 illustrates the potential interference between a channel broadcast in accordance with this invention and the left first adjacent analog FM channel in an IBOC DAB system.
Figure 6:
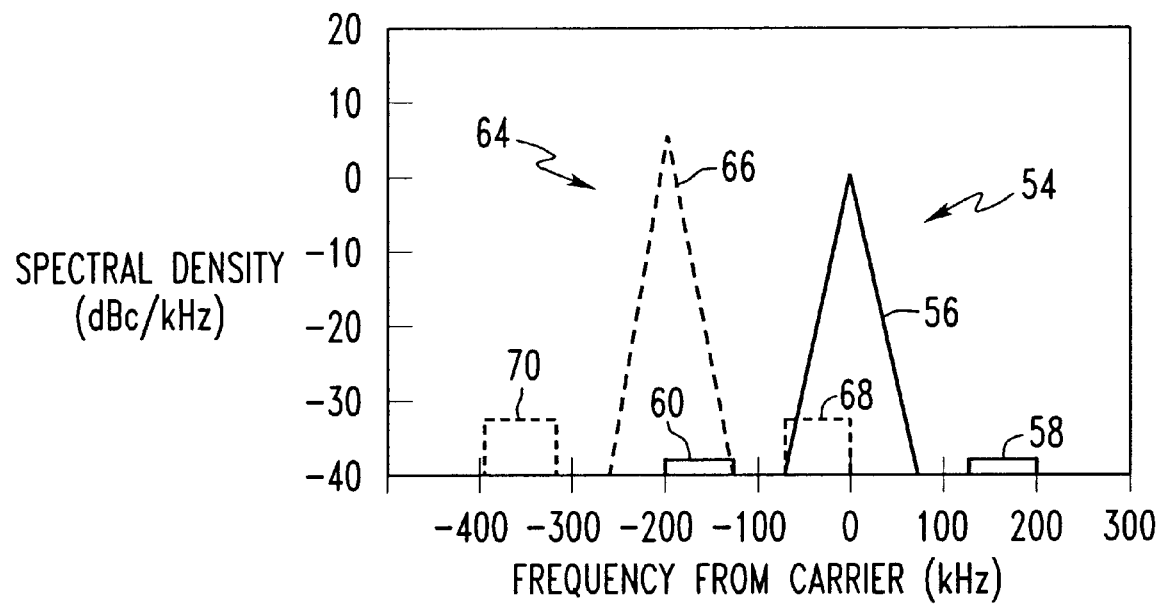
FIG. 6 illustrates the potential interference between a channel broadcast in accordance with this invention and the left first adjacent IBOC DAB channel in an IBOC DAB system.

The interference to and from the first adjacent channels placed +200 kHz away from the host signal can be derived from the relationship of the adjacent signals shown in the plot of FIG. 5. FIG. 5 shows a hybrid DAB signal 54 having a central frequency band signal 56 and upper and lower sidebands 58 and 60, and a conventional first adjacent left channel 62. FM stations are geographically placed such that the nominal received power of an undesired adjacent channel is at least 6 dB below the desired station's power at the edge of its coverage area. Then the D/U (desired to undesired power ratio in dB) is at least 6 dB. Knowledge of the ratio of each station's DAB signal power to its FM host permits assessment of first adjacent interference to DAB. Similarly the interference of the first adjacent DAB signal 64 (with central frequency band signal 66 and upper and lower sidebands 68 and 70) to the host FM signal can be assessed from the relationship shown in FIG. 6. In this example the host signal is shown at 200 kHz offset from the interferer.

Interference from a second adjacent DAB interference to the host DAB signal has also been addressed. This problem has been avoided by limiting the far edge of the DAB signal to within 200 kHz of its host carrier frequency to prevent spectral overlap.

Analysis of the DAB to first adjacent interference at the edge of coverage showed that the total DAB signal should be set at about −21 to −25 dB relative to its FM host power. This reduces the adjacent DAB interference ratio to the FM signal from about −24 dB to about −31 to −34 dB, assuming the D/U at the edge of coverage is 6 dB.

Although FM channel spacing in some countries is 100 kHz, these first adjacents are geographically separated such that FM reception is not impaired within the coverage area. Therefore this should pose no problem to the FM IBOC system. The DAB to DAB interference at 300 kHz spacing can impair performance on one sideband, but the CPC code is designed to tolerate this condition.

An OFDM technique has been described for IBOC DAB. An OFDM signal consists of orthogonally spaced carriers all modulated at a common symbol rate. The frequency spacing for rectangular pulse symbols (e.g., BPSK, QPSK, 8PSK or QAM) is equal to the symbol rate. For IBOC transmission of FM/DAB signals, a redundant set of OFDM sub-carriers is placed within about 100 kHz to 200 kHz on either side of a coexisting FM channel spectrum. The DAB power (upper or lower sideband) is set to about −25 dB relative to the FM signal. The level and spectral occupancy of the DAB signal is set to limit interference to its FM host while providing adequate SNR for the DAB sub-carriers. First adjacent signals spaced at +−200 kHz from the FM carrier can corrupt the DAB signal. However, at any particular location within a station's coverage area, it is unlikely that both first adjacents will significantly interfere with DAB. Therefore the upper and lower DAB sidebands carry the same redundant information such that only one sideband is needed to communicate the information.

Inherent advantages of OFDM include robustness in the presence of multipath interference, and tolerance to non-gaussian short term noise or notches due to selective fading. The relatively long symbol integration times tend to "gaussianize" these short-term degradations.

Figure 7:
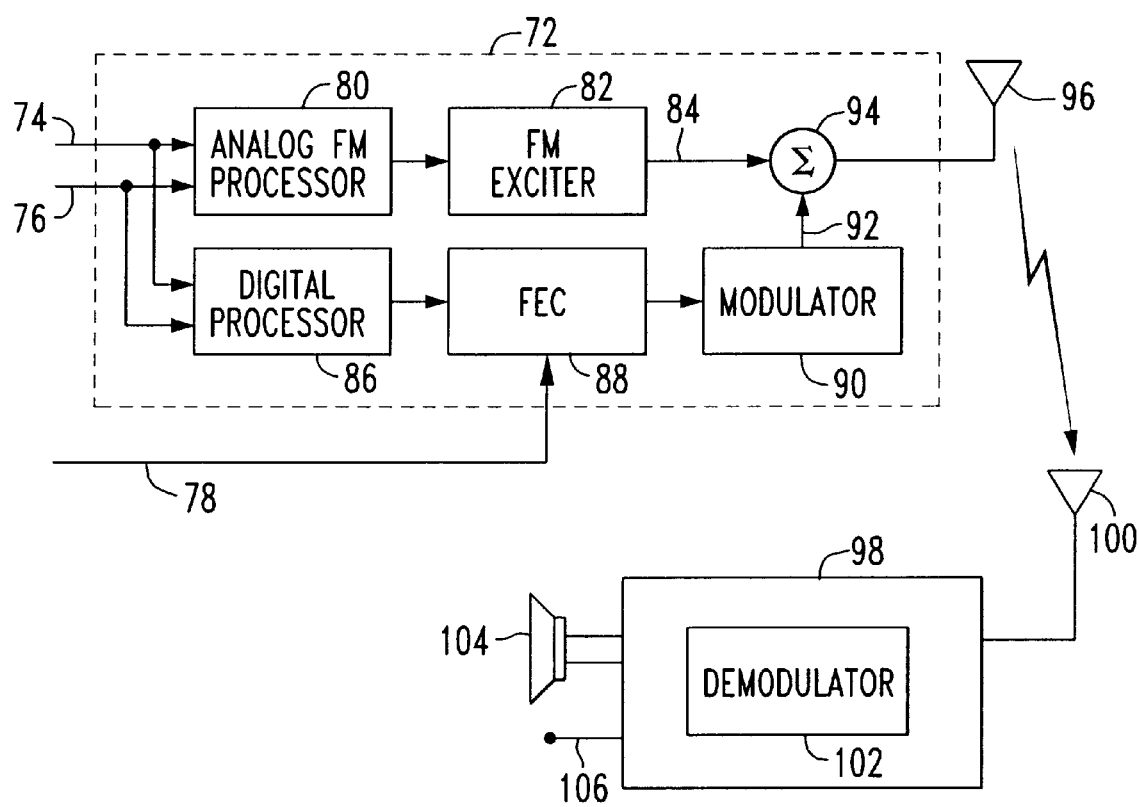
FIG. 7 is a simplified block diagram of a broadcasting system which may incorporate the modulation method of the present invention.

FIG. 7 is a greatly simplified block diagram of a digital audio broadcast system constructed in accordance with the invention. A transmitter 72 includes inputs 74 and 76 for receiving left and right channels of the program material. A separate data input 78 is included for an additional data signal, particularly for use with the all-digital modulation format of this invention. The transmitter includes an analog FM processor 80 and FM exciter 82 which operate in accordance with prior art processors and exciters to produce an analog FM broadcast signal on line 84. The inputs 74 and 76 are also fed to a coding processor 86 which converts the program material in complementary punctured convolution coded signals that are error corrected in block 88 and fed to a modulator 90 which applies the coded signals to the plurality of sub-carriers using orthogonal frequency division modulation. The output 92 of the modulator is summed with the signal on line 84 in summer 94 and sent to antenna 96. The receiver 98 receives the transmitted signal on antenna 100 and demodulates the signal in demodulator 102 to recover the program material and associated data, if included. The audio information is sent to a speaker 104 and additional data, if any, is provided to output 106, which may be fed to a display or other device that can further process the data.

The present invention provides modulation formats for FM hybrid and all-digital In-Band On-Channel (IBOC) Digital Audio Broadcast (DAB) systems. The FM hybrid IBOC modulation format is backward compatible with the existing FM analog system, and the all-digital IBOC modulation format is backward compatible with the FM hybrid IBOC system. The all-digital format embodiment of the present invention enables a substantially greater datacasting capacity. The modulation formats presented here allow a compatible transition for the broadcasters and listeners to migrate to digital signal virtual-CD audio quality while also providing a new datacasting medium.

The IBOC DAB modulation format of the present invention uses a complementary punctured convolution (CPC) coded version of the program material in two sidebands (upper sideband and lower sideband) which are potentially impaired by nearly independent interferers with independent fading. If one sideband is completely corrupted by a strong first adjacent FM signal in the vicinity of the receiver, the opposite sideband must be independently decodable at the receiver. Therefore each sideband must be coded with an independently decodable FEC code. However, when both sidebands contain useful information that is not completely corrupted by an interferer, then CPC codes provide additional coding gain above that achieved by power combining the two sides.

While the present invention has been illustrated in terms of its preferred embodiments, it should be understood that various changes may be made to the disclosed method and system without departing from the scope of the invention which is defined by the following claims. For example, while the above preferred embodiment shows the use of QPSK using CPC codes, various other modulation formats and code types may be used, such as 8PSK using ⅔ trellis code modulation followed by an optional Reed Soloman block code.

What is claimed is:

1. A method of broadcasting comprising the steps of:
providing a broadcast signal in a central frequency band of an FM radio channel;
providing a first plurality of sub-carriers in an upper sideband of said FM radio channel, said upper sideband lying within a frequency band extending from about +100 kHz to about +200 kHz from a center frequency of said radio channel;
providing a second plurality of sub-carriers in a lower sideband of said FM radio channel, said lower sideband lying within a frequency band extending from about −100 kHz to about −200 kHz from the center frequency of said radio channel;
modulating a first group of said first plurality of sub-carriers and a first group of said second plurality of sub-carriers with a complementary punctured convolutional coded version of program material;
transmitting said broadcast signal, said first group of said first plurality of sub-carriers and said first group of said second plurality of sub-carriers.

2. The method of claim 1, wherein bits of said complementary punctured convolution coded version of said program material which contribute least to coding gain are transmitted in selected ones of said first and second plurality of sub-carriers lying farthest from the center frequency.

3. The method of claim 1, further comprising the steps of:
receiving at least one of said broadcast signal, said first group of said first plurality of sub-carriers and said first group of said second plurality of sub-carriers; and
demodulating said at least one of said broadcast signal, said first group of said first plurality of sub-carriers and said first group of said second plurality of sub-carriers.

4. The method of claim 1, wherein said broadcast signal is an analog FM signal modulated by said program material.

5. The method of claim 4, further comprising the steps of:
providing a second group of said first plurality of sub-carriers; and
providing a second group of said second plurality of sub-carriers;
said second group of said first plurality of sub-carriers being modulated with parity bits for said complementary punctured convolutional coded version of program material; and
said second group of said second plurality of sub-carriers being modulated with parity bits for said complementary punctured convolutional coded version of program material.

6. The method of claim 5, further comprising the steps of:
providing a third group of said first plurality of sub-carriers; and
providing a third group of said second plurality of sub-carriers;
said third group of said first plurality of sub-carriers being modulated with parity bits for said complementary punctured convolutional coded version of program material; and
said third group of said second plurality of sub-carriers being modulated with parity bits for said complementary punctured convolutional coded version of program material.

7. The method of claim 6, wherein:
said radio channel includes a plurality of evenly spaced sub-carrier locations, a first plurality of said sub-carrier locations being positioned at frequencies above a center frequency of said radio channel and identified as sub-carrier locations 1 through 273, and a second plurality of said sub-carrier locations being positioned at frequencies below said center frequency of said radio channel and identified as sub-carrier locations −1 through −273;
said first group of said first plurality of sub-carriers being positioned at sub-carriers locations 178 through 253;
said first group of said second plurality of sub-carriers being positioned at sub-carriers locations −178 through −253;
said second group of said first plurality of sub-carriers being positioned at sub-carriers locations 254 through 272;
said second group of said second plurality of sub-carriers being positioned at sub-carriers locations −254 through −272;
said third group of said first plurality of sub-carriers being positioned at sub-carriers locations 159 through 177; and
said third group of said second plurality of sub-carriers being positioned at sub-carriers locations −159 through −177.

8. The method of claim 5, wherein:
said radio channel includes a plurality of evenly spaced sub-carrier locations, a first plurality of said sub-carrier locations being positioned at frequencies above a center frequency of said radio channel and identified as sub-carrier locations 1 through 273, and a second plurality of said sub-carrier locations being positioned at frequencies below said center frequency of said radio channel and identified as sub-carrier locations −1 through −273;
said first group of said first plurality of sub-carriers being positioned at sub-carriers locations 178 through 253;
said first group of said second plurality of sub-carriers being positioned at sub-carriers locations −178 through −253;
said second group of said first plurality of sub-carriers being positioned at sub-carriers locations 254 through 272; and
said second group of said second plurality of sub-carriers being positioned at sub-carriers locations −254 through −272.

9. The method of claim 1, further comprising the steps of:
providing a second group of said first plurality of sub-carriers; and
providing a second group of said second plurality of sub-carriers;
said second group of said first plurality of sub-carriers being modulated with digitally encoded additional information; and
said second group of said second plurality of sub-carriers being modulated with parity bits for said digitally encoded additional information.

10. The method of claim 9, further comprising the steps of:
providing a third group of said first plurality of sub-carriers; and
providing a third group of said second plurality of sub-carriers;
said third group of said first plurality of sub-carriers being modulated with parity bits for said digitally encoded additional information; and
said third group of said second plurality of sub-carriers being modulated with parity bits for said digitally encoded additional information.

11. The method of claim 9, wherein:
said digitally encoded additional information includes at least one of surround-sound, slow-scan video and data.

12. The method of claim 1, wherein said broadcast signal comprises a third plurality of sub-carriers, said third plurality of sub-carriers being modulated with additional digital information.

13. The method of claim 12, further comprising the steps of:
providing a second group of said first plurality of sub-carriers; and
providing a second group of said second plurality of sub-carriers;
said second group of said first plurality of sub-carriers being modulated with parity bits for said complementary punctured convolutional coded version of program material; and
said second group of said second plurality of sub-carriers being modulated with parity bits for said complementary punctured convolutional coded version of program material.

14. The method of claim 13, further comprising the steps of:
providing a third group of said first plurality of sub-carriers; and
providing a third group of said second plurality of sub-carriers;
said third group of said first plurality of sub-carriers being modulated with parity bits for said complementary punctured convolution coded version of program material; and
said third group of said second plurality of sub-carriers being modulated with parity bits for said complementary punctured convolutional coded version of program material.

15. The method of claim 12, further comprising the steps of:
providing a second group of said first plurality of sub-carriers; and
providing a second group of said second plurality of sub-carriers;
said second group of said first plurality of sub-carriers being modulated with digitally encoded additional information; and
said second group of said second plurality of sub-carriers being modulated with parity bits for said digitally encoded additional information.

16. The method of claim 15, further comprising the steps of:
providing a third group of said first plurality of sub-carriers; and
providing a third group of said second plurality of sub-carriers;
said third group of said first plurality of sub-carriers being modulated with parity bits for said digitally encoded additional information; and
said third group of said second plurality of sub-carriers being modulated with parity bits for said digitally encoded additional information.

17. The method of claim 15, wherein:
said radio channel includes a plurality of evenly spaced sub-carrier locations, a first plurality of said sub-carrier locations being positioned at frequencies above a center frequency of said radio channel and identified as sub-carrier locations 1 through 273, and a second plurality of said sub-carrier locations being positioned at frequencies below said center frequency of said radio channel and identified as sub-carrier locations −1 through −273;
said first group of said first plurality of sub-carriers being positioned at sub-carriers locations 173 through 253;
said first group of said second plurality of sub-carriers being positioned at sub-carriers locations −173 through −253;
said second group of said first plurality of sub-carriers being positioned at sub-carriers locations 140 through 158; and
said second group of said second plurality of sub-carriers being positioned at sub-carriers locations −140 through −158.

18. The method of claim 1, wherein:
a first portion of said complementary punctured convolutional coded version of said program material used to modulate said first group of said first plurality of sub-carriers and a second portion of said complementary punctured convolutional coded version of said program material used to modulate said first group of said second plurality of sub-carriers are independently decodable.

19. The method of claim 1, wherein:
said radio channel includes a plurality of evenly spaced sub-carrier locations, a first plurality of said sub-carrier locations being positioned at frequencies above a center frequency of said radio channel and identified as sub-carrier locations 1 through 273, and a second plurality of said sub-carrier locations being positioned at frequencies below said center frequency of said radio channel and identified as sub-carrier locations −1 through −273;
said first group of said first plurality of sub-carriers being positioned at sub-carriers locations 178 through 253; and
said first group of said second plurality of sub-carriers being positioned at sub-carriers locations −178 through −253.

20. A method of broadcasting comprising the steps of:
providing a first plurality of sub-carriers in an upper sideband of an FM radio channel, said upper sideband ranging from about +100 kHz to +200 kHz from a center frequency of said radio channel;
providing a second plurality of sub-carriers in a lower sideband of said FM radio channel, said lower sideband ranging from about +100 kHz to +200 kHz from a center frequency of said radio channel;
orthogonally frequency division modulating a first group of said first plurality of sub-carriers with a digitally coded encoded version of program signal to be transmitted;

orthogonally frequency division modulating a first group of said second plurality of sub-carriers with said digitally coded version of said program signal to be transmitted;

providing a third plurality of sub-carriers in a central frequency band of said FM radio channel, wherein the power spectral density of the third plurality of sub-carriers is less than the power spectral density of the sub-carriers in the upper and lower sidebands;

modulating said third plurality of sub-carriers with additional data; and transmitting said first group of said first plurality of sub-carriers, said first group of said second plurality of sub-carriers, and said third plurality of sub-carriers.

21. The method of claim 20, further comprising the steps of:

providing a second group of said first plurality of sub-carriers; and providing a second group of said second plurality of sub-carriers;

said second group of said first plurality of sub-carriers being modulated with parity bits for said digitally encoded version of program material; and said second group of said second plurality of sub-carriers being modulated with parity bits for said digitally encoded version of program material.

22. The method of claim 21, further comprising the steps of:

providing a third group of said first plurality of sub-carriers; and providing a third group of said second plurality of sub-carriers;

said third group of said first plurality of sub-carriers being modulated with parity bits for said digitally encoded version of program material; and said third group of said second plurality of sub-carriers being modulated with parity bits for said digitally encoded version of program material.

23. The method of claim 20, further comprising the steps of:

providing a second group of said first plurality of sub-carriers; and providing a second group of said second plurality of sub-carriers;

said second group of said first plurality of sub-carriers being modulated with digitally encoded additional information; and said second group of said second plurality of sub-carriers being modulated with parity bits for said digitally encoded additional information.

24. The method of claim 23, further comprising the steps of:

providing a third group of said first plurality of sub-carriers; and providing a third group of said second plurality of sub-carriers;

said third group of said first plurality of sub-carriers being modulated with parity bits for said digitally encoded additional information; and said third group of said second plurality of sub-carriers being modulated with parity bits for said digitally encoded additional information.

25. A transmitter for broadcasting in-band-on-channel digital audio signals, said transmitter comprising:

means for producing a broadcast signal in a central frequency band of an FM radio channel, a first plurality of sub-carriers in an upper sideband of said FM radio channel, said upper sideband lying within a frequency band extending from about +100 kHz to about +200 kHz from a center frequency of said radio channel and a second plurality of sub-carriers in a lower sideband of said FM radio channel, said lower sideband lying within a frequency band extending from about −100 kHz to about −200 kHz from the center frequency of said radio channel;

means for modulating a first group of said first plurality of sub-carriers and a first group of said second plurality of sub-carriers with a complementary punctured convolutional coded encoded version of program material; and means for transmitting said first group of said first plurality of sub-carriers, said first group of said second plurality of sub-carriers, and said broadcast signal.

26. A transmitter for broadcasting in-band-on-channel digital audio signals, said transmitter comprising:

means for producing a first plurality of sub-carriers in an upper sideband of an FM radio channel, said upper sideband lying within a frequency band extending from about +100 kHz to about +200 kHz from a center frequency of said radio channel, a second plurality of sub-carriers in a lower sideband of said FM radio channel, said lower sideband lying within a frequency band extending from about −100 kHz to about −200 kHz from the center frequency of said radio channel, and a third plurality of sub-carriers in a central frequency band of the FM radio channel, wherein the third plurality of sub-carriers have a lower power spectral density than that of the first and second plurality of sub-carriers;

means for modulating a first group of said first plurality of sub-carriers with a coded version of program material;

means for modulating a first group of said second plurality of sub-carriers with said coded version of said program material;

means for modulating said third plurality of sub-carriers with additional data; and means for transmitting said first group of said first plurality of sub-carriers, said first group of said second plurality of sub-carriers, and said third plurality of sub-carriers.

27. A receiver for receiving in-band-on-channel digital audio signals, said receiver comprising:

means for receiving a broadcast signal in a central frequency band of an FM radio channel; a first plurality of sub-carriers in an upper sideband of said FM radio channel, said upper sideband lying within a frequency band extending from about +100 kHz to about +200 kHz from a center frequency of said radio channel; and a second plurality of sub-carriers in a lower sideband of said FM radio channel, said lower sideband lying within a frequency band extending from about −100 kHz to about −200 kHz from the center frequency of said radio channel, said first plurality of sub-carriers and said second plurality of sub-carriers being modulated with a complementary punctured convolutional coded encoded version of the program material;

means for demodulating a first group of said first plurality of sub-carriers;

means for demodulating a first group of said second plurality of sub-carriers; and means for outputting said program material obtained from demodulating said first group of said first plurality of sub-carriers and said second plurality of sub-carriers.

28. A receiver for receiving in-band-on-channel digital audio signals, said receiver comprising:

means for receiving a first plurality of sub-carriers in an upper sideband of said FM radio channel, said upper sideband lying within a frequency band extending from about +100 kHz to about +200 kHz from a center frequency of said radio channel, said first plurality of sub-carriers being modulated with a complementary punctured convolution coded encoded version of the program material; a second plurality of sub-carriers in a lower sideband of said FM radio channel, said lower sideband lying within a frequency band extending from about −100 kHz to about −200 kHz from the center frequency of said radio channel, said second plurality of sub-carriers being modulated with a complementary punctured convolution coded encoded version of the program material; and a third plurality of sub-carriers, said third plurality of sub-carriers having a lower power spectral density than that of said first and second plurality of sub-carriers;

means for demodulating a first group of said first plurality of sub-carriers, a first group of said second plurality of sub-carriers, and said third plurality of sub-carriers; and means for outputting said program material obtained from demodulating said first group of said first plurality of sub-carriers and said second plurality of sub-carriers, and additional data obtained from demodulating said third plurality of sub-carriers.

29. A method of broadcasting comprising the steps of:

providing an analog FM signal modulated by program material in a central frequency band of an FM radio channel, said central frequency band extending from about +100 kHz to about −100 kHz from a center frequency of said radio channel;

providing a first plurality of sub-carriers in an upper sideband of said FM radio channel, said upper sideband lying within a frequency band extending from about +100 kHz to about +200 kHz from said center frequency of said radio channel;

providing a second plurality of sub-carriers in a lower sideband of said FM radio channel, said lower sideband lying within a frequency band extending from about −100 kHz to about −200 kHz from the center frequency of said radio channel;

modulating a first group of said first plurality of sub-carriers with a complementary punctured convolutional coded version of said program material;

modulating a first group of said second plurality of sub-carriers with said complementary punctured convolutional coded version of said program material;

modulating a second group of said first plurality of sub-carriers with digitally encoded additional information, wherein said second group of said first plurality of sub-carriers lies within a frequency band extending from about +100 kHz to about +130 kHz from said center frequency of said radio channel;

modulating a second group of said second plurality of sub-carriers with said digitally encoded additional information wherein said second group of second plurality of sub-carriers lies within a frequency band extending from about −100 kHz to about −130 kHz from said center frequency of said radio channel; and transmitting said analog FM signal, said first and second groups of said first plurality of sub-carriers, and said first and second groups of said second plurality of sub-carriers.

30. The method of claim 29, wherein bits of said digitally encoded version of said program material which contribute least to coding gain are transmitted in selected ones of said first and second plurality of sub-carriers lying farthest from the center frequency.

31. The method of claim 29, further comprising the steps of:

receiving said analog modulated FM signal, said first and second groups of said first plurality of sub-carriers, and said first and second groups of said second plurality of sub-carriers; and demodulating said analog modulated FM signal, said first and second groups of said first plurality of sub-carriers, and said first and second groups of said second plurality of sub-carriers.

32. The method of claim 29, further comprising the steps of:

providing a third group of said first plurality of sub-carriers; and providing a third group of said second plurality of sub-carriers;

said third group of said first plurality of sub-carriers being modulated with parity bits for said digitally encoded version of program material; and said third group of said second plurality of sub-carriers being modulated with parity bits for said digitally encoded version of program material.

33. A transmitter for broadcasting in-band-on-channel digital audio signals, said transmitter comprising:

means for providing an analog FM signal modulated by program material in a central frequency band of an FM radio channel, said central frequency band extending from about +100 kHz to about −100 kHz from a center frequency of said radio channel;

means for providing a first plurality of sub-carriers in an upper sideband of said FM radio channel, said upper sideband lying within a frequency band extending from about +100 kHz to about +200 kHz from said center frequency of said radio channel;

means for providing a second plurality of sub-carriers in a lower sideband of said FM radio channel, said lower sideband lying within a frequency band extending from about −100 kHz to about −200 kHz from said center frequency of said radio channel;

means for modulating a first group of said first plurality of sub-carriers and a first group of said second plurality of sub-carriers with a digitally encoded version of said program material;

means for modulating a second group of said first plurality of sub-carriers with digitally encoded additional information, wherein said second group of said first plurality of sub-carriers lies within a frequency band extending from about +100 kHz to about +130 kHz from said center frequency of said radio channel;

means for modulating a second group of said second plurality of sub-carriers with said digitally encoded additional information wherein said second group of said second plurality of sub-carriers lies within a frequency band extending from about −100 kHz to about −130 kHz from said center frequency of said radio channel; and means for transmitting said analog FM signal, said first and second groups of said first plurality of sub-carriers, and said first and second groups of said second plurality of sub-carriers.

34. A receiver for receiving in-band-on-channel digital audio signals, said receiver comprising:

means for receiving an analog modulated FM signal in a central frequency band of an FM radio channel, said central frequency band extending from about +100 kHz to about −100 kHz from a center frequency of said radio channel; a first plurality of sub-carriers in an upper sideband of said FM radio channel, said upper sideband lying within a frequency band extending from about +100 kHz to about +200 kHz from said center frequency of said radio channel, a first group of said first plurality of sub-carriers being modulated with a complementary punctured convolutional coded version of program material and a second group of said first plurality of sub-carriers being modulated with digitally encoded additional information, wherein said second group of said first plurality of sub-carriers lies within a frequency band extending from about +100 kHz to about +130 kHz from said center frequency of said radio channel; and a second plurality of sub-carriers in a lower sideband of said FM radio channel, said lower sideband lying within a frequency band extending from about −100 kHz to about −200 kHz from said center frequency of said radio channel, a first group of said second plurality of sub-carriers being modulated with said complementary punctured convolutional coded version of the program material and a second group of said second plurality of sub-carriers being modulated with said digitally encoded additional information, wherein said second group of said second plurality of sub-carriers lies within a frequency band extending from about −100 kHz to about −130 kHz from said center frequency of said radio channel;

means for demodulating said analog modulated FM signal, said first and second groups of said first plurality of sub-carriers, and said first and second groups of said second plurality of sub-carriers; and means for outputting said program material and said additional information obtained from demodulating said analog modulated FM signal, said first and second groups of said first plurality of sub-carriers, and said first and second groups of second plurality of sub-carriers.

35. A transmitter for broadcasting in-band-on-channel digital audio signals, said transmitter comprising:

an input for receiving program material;

a processor for producing a broadcast signal in a central frequency band of an FM radio channel;

a modulator for modulating a first group of a first plurality of sub-carriers with a complementary punctured convolutional coded version of program material, said first plurality of sub-carriers lying in an upper sideband of said FM radio channel, said upper sideband lying within a frequency band extending from about +100 kHz to about +200 kHz from a center frequency of said radio channel, and for modulating a first group of a second plurality of sub-carriers with said complementary punctured convolutional coded version of said program material, said second plurality of sub-carriers lying in a lower sideband of said FM radio channel, said lower sideband lying within a frequency band extending from about −100 kHz to about −200 kHz from the center frequency of said radio channel; and an output for transmitting said first group of said first plurality of sub-carriers, said first group of said second plurality of sub-carriers, and said broadcast signal.

36. A transmitter for broadcasting in-band-on-channel digital audio signals, said transmitter comprising:

an input for receiving program material;

a modulator for modulating a first group of a first plurality of sub-carriers with a complementary punctured convolutional coded version of said program material, said first plurality of sub-carriers lying in an upper sideband of an FM radio channel, said upper sideband lying within a frequency band extending from about +100 kHz to about +200 kHz from a center frequency of said radio channel, and for modulating a first group of a second plurality of sub-carriers with said complementary punctured convolutional coded version of said program material, said second plurality of sub-carriers lying in a lower sideband of said FM radio channel, said lower sideband lying within a frequency band extending from about −100 kHz to about −200 kHz from the center frequency of said radio channel, and for modulating a third plurality of sub-carriers with additional data, said third plurality of sub-carriers lying in a central frequency band of the FM radio channel, wherein the third plurality of sub-carriers have a lower power spectral density than that of the first and second plurality of sub-carriers; and an output for transmitting said first group of said first plurality of sub-carriers, said first group of said second plurality of sub-carriers, and said third plurality of sub-carriers.

37. A receiver for receiving in-band-on-channel digital audio signals, said receiver comprising:

an input for receiving a broadcast signal in a central frequency band of an FM radio channel; a plurality of sub-carriers in an upper sideband of said FM radio channel, said upper sideband lying within a frequency band extending from about +100 kHz to about +200 kHz from a center frequency of said radio channel, a first group of said first plurality of sub-carriers being modulated with a complementary punctured convolutional coded encoded version of program material; and a second plurality of sub-carriers in a lower sideband of said FM radio channel, said lower sideband lying within a frequency band extending from about −100 kHz to about −200 kHz from the center frequency of said radio channel, a first group of said second plurality of sub-carriers being modulated with said complementary punctured convolutional coded encoded version of the program material;

a demodulator for demodulating said first group of said first plurality of sub-carriers, and for demodulating said first group of said second plurality of sub-carriers; and an output for outputting said program material obtained from demodulating said first group of said first plurality of sub-carriers and said second plurality of sub-carriers.

38. A receiver for receiving in-band-on-channel digital audio signals, said receiver comprising:

an input for receiving a first plurality of sub-carriers in an upper sideband of said FM radio channel, said upper sideband lying within a frequency band extending from about +100 kHz to about +200 kHz from a center frequency of said radio channel, a first group of said first plurality of sub-carriers being modulated with a complementary punctured convolutional coded encoded version of the program material; a second plurality of sub-carriers in a lower sideband of said FM radio channel, said lower sideband lying within a frequency band extending from about −100 kHz to about −200 kHz from the center frequency of said radio channel, a first group of said second plurality of sub-carriers being modulated with a complementary punctured convolutional coded encoded version of the program material; and a third plurality of sub-carriers, said third plurality of sub-carriers having a lower power spectral density than that of said first and second plurality of sub-carriers, and being modulated with additional data;

a demodulator for demodulating said first group of said first plurality of sub-carriers, said first group of said second plurality of sub-carriers, and said third plurality of sub-carriers; and an output for outputting said program material obtained from demodulating said first group of said first plurality of sub-carriers and said second plurality of sub-carriers, and additional data obtained from demodulating said third plurality of sub-carriers.

39. A method of broadcasting comprising the steps of:

providing a first signal in a central frequency band of an FM radio channel;

providing a first plurality of sub-carriers in an upper sideband of said FM radio channel, said upper sideband lying within a frequency band extending from about +100 kHz to about +200 kHz from a center frequency of said radio channel;

providing a second plurality of sub-carriers in a lower sideband of said FM radio channel, said lower sideband lying within a frequency band extending from about −100 kHz to about −200 kHz from the center frequency of said radio channel;

modulating a first group of said first plurality of sub-carriers and a first group of said second plurality of sub-carriers with a complementary punctured convolutional coded encoded version of program material;

transmitting said first signal, said first group of said first plurality of sub-carriers and said first group of said second plurality of sub-carriers;

receiving said first signal, said first group of said first plurality of sub-carriers, and said first group of said second plurality of sub-carriers;

demodulating one or more of said first signal, said first group of said first plurality of sub-carriers, and said first group of said second plurality of sub-carriers; and outputting an output signal obtained from the demodulating step.

40. The method of claim 39, wherein:

said first signal comprises an analog modulated FM signal.

41. The method of claim 39, wherein:

said first signal comprises a third plurality of sub-carriers.

42. A broadcasting system comprising:

means for providing a first signal in a central frequency band of an FM radio channel;

means for providing a first plurality of sub-carriers in an upper sideband of said FM radio channel, said upper sideband lying within a frequency band extending from about +100 kHz to about +200 kHz from a center frequency of said radio channel;

means for providing a second plurality of sub-carriers in a lower sideband of said FM radio channel, said lower sideband lying within a frequency band extending from about −100 kHz to about −200 kHz from the center frequency of said radio channel;

means for modulating a first group of said first plurality of sub-carriers and a first group of said second plurality of sub-carriers with a complementary punctured convolutional coded encoded version of program material;

means for transmitting said first signal, said first group of said first plurality of sub-carriers and said first group of said second plurality of sub-carriers;

means for receiving said first signal, said first group of said first plurality of sub-carriers, and said first group of said second plurality of sub-carriers;

means for demodulating one or more of said first signal, said first group of said first plurality of sub-carriers, and said first group of said second plurality of sub-carriers; and means for outputting an output signal obtained from the demodulating step.

43. The broadcasting system of claim 42, wherein:

said first signal comprises an analog modulated FM signal.

44. The broadcasting system of claim 42, wherein:

said first signal comprises a third plurality of sub-carriers.

45. A broadcasting system comprising:

an exciter for providing a first signal in a central frequency band of an FM radio channel;

a processor for providing a first plurality of sub-carriers in an upper sideband of said FM radio channel, said upper sideband lying within a frequency band extending from about +100 kHz to about +200 kHz from a center frequency of said radio channel, and for providing a second plurality of sub-carriers in a lower sideband of said FM radio channel, said lower sideband lying within a frequency band extending from about −100 kHz to about −200 kHz from the center frequency of said radio channel;

a modulator for modulating a first group of said first plurality of sub-carriers and a first group of said second plurality of sub-carriers with a complementary punctured convolutional coded encoded version of program material;

an first antenna for transmitting said first signal, said first group of said first plurality of sub-carriers and said first group of said second plurality of sub-carriers; and a receiver including a second antenna for receiving said first signal, said first group of said first plurality of sub-carriers, and said first group of said second plurality of sub-carriers; a demodulator for demodulating one or more of said first signal, said first group of said first plurality of sub-carriers, and said first group of said second plurality of sub-carriers; and an output for outputting an output signal obtained from the demodulator.

46. The broadcasting system of claim 45, wherein:

said first signal comprises an analog modulated FM signal.

47. The broadcasting system of claim 45, wherein:

said first signal comprises a third plurality of sub-carriers.

48. A transmitter comprising:

an exciter for producing a broadcast signal in a central frequency band of an FM radio channel, a first plurality of sub-carriers in an upper sideband of said FM radio channel, said upper sideband lying within a frequency band extending from about +100 kHz to about +200 kHz from a center frequency of said radio channel, and a second plurality of sub-carriers in a lower sideband of said FM radio channel, said lower sideband lying within a frequency band extending from about −100 kHz to about −200 kHz from the center frequency of said radio channel;

a modulator for modulating a first group of said first plurality of sub-carriers and a first group of said second plurality of sub-carriers with a first complementary punctured convolutional coded encoded version of program material; and an output for transmitting said broadcast signal, said first group of said first plurality of sub-carriers and said first group of said second plurality of sub-carriers;

wherein bits of said complementary punctured convolutional coded version of said program material which contribute least to coding gain are transmitted in selected ones of said first and second plurality of sub-carriers lying farthest from a center frequency of said FM radio channel.

49. The transmitter of claim 48, wherein said broadcast signal comprises:

an analog FM signal modulated by said program material.

50. The transmitter of claim 48, wherein said broadcast signal comprises:

a third plurality of sub-carriers.

51. The transmitter of claim 48, wherein said exciter further produces a second group of said first plurality of sub-carriers and a second group of said second plurality of sub-carriers; and wherein said modulator modulates said second group of said first plurality of sub-carriers and said second group of said second plurality of sub-carriers with a second complementary punctured convolutional coded version of program material, said second complementary punctured convolutional coded version of program material having a lower code rate than said first complementary punctured convolutional coded version of program material.

52. The transmitter of claim 48, wherein said exciter further produces a second group of said first plurality of sub-carriers and a second group of said second plurality of sub-carriers; and wherein said modulator modulates said second group of said first plurality of sub-carriers and said second group of said second plurality of sub-carriers with parity bits for said complementary punctured convolutional coded version of program material.

53. The transmitter of claim 51, wherein said second group of said first plurality of sub-carriers lie in a frequency band closer to a center frequency of said FM radio channel than a frequency band occupied by said first group of said first plurality of sub-carriers; and said second group of said second plurality of sub-carriers lie in a frequency band closer to a center frequency of said FM radio channel than a frequency band occupied by said first group of said second plurality of sub-carriers.

54. The transmitter of claim 52, wherein said exciter further produces a third group of said first plurality of sub-carriers and a third group of said second plurality of sub-carriers; and wherein said modulator modulates said third group of said first plurality of sub-carriers and said third group of said second plurality of sub-carriers with a second complementary punctured convolutional coded version of program material, said second complementary punctured convolutional coded version of program material having a lower code rate than said first complementary punctured convolutional coded version of program material.

55. The transmitter of claim 54, wherein said exciter further produces a fourth group of said first plurality of sub-carriers and a fourth group of said second plurality of sub-carriers; and wherein said modulator modulates said fourth group of said first plurality of sub-carriers and said fourth group of said second plurality of sub-carriers with additional data.

56. A broadcasting system comprising:

a transmitter including an exciter for producing a broadcast signal in a central frequency band of an FM radio channel, a first plurality of sub-carriers in an upper sideband of said FM radio channel, said upper sideband lying within a frequency band extending from about +100 kHz to about +200 kHz from a center frequency of said radio channel, and a second plurality of sub-carriers in a lower sideband of said FM radio channel, said lower sideband lying within a frequency band extending from about −100 kHz to about −200 kHz from the center frequency of said radio channel; a modulator for modulating a first group of said first plurality of sub-carriers and a first group of said second plurality of sub-carriers with a first complementary punctured convolutional coded encoded version of program material; and an output for transmitting said broadcast signal, said first group of said first plurality of sub-carriers and said first group of said second plurality of sub-carriers; and a receiver including a second input for receiving said broadcast signal, said first group of said first plurality of sub-carriers, and said first group of said second plurality of sub-carriers; a demodulator for demodulating one or more of said first signal, said first group of said first plurality of sub-carriers, and said first group of said second plurality of sub-carriers; and an output for outputting an output signal obtained from the demodulator.

57. The broadcasting system of claim 56, wherein bits of said complementary punctured convolutional coded version of said program material which contribute least to coding gain are transmitted in selected ones of said first and second plurality of sub-carriers lying farthest from a center frequency of said FM radio channel.

58. The broadcasting system of claim 56, wherein said broadcast signal comprises:

an analog FM signal modulated by said program material.

59. The broadcasting system of claim 56, wherein said broadcast signal comprises:

a third plurality of sub-carriers.

60. The broadcasting system of claim 56, wherein said exciter further produces a second group of said first plurality of sub-carriers and a second group of said second plurality of sub-carriers; and wherein said modulator modulates said second group of said first plurality of sub-carriers and said second group of said second plurality of sub-carriers with a second complementary punctured convolutional coded version of program material, said second complementary punctured convolutional coded version of program material having a lower code rate than said first complementary punctured convolutional coded version of program material.

61. The broadcasting system of claim 56, wherein said exciter further produces a second group of said first plurality of sub-carriers and a second group of said second plurality of sub-carriers; and wherein said modulator modulates said second group of said first plurality of sub-carriers and said second group of said second plurality of sub-carriers with parity bits for said complementary punctured convolutional coded version of program material.

62. The broadcasting system of claim 60, wherein said second group of said first plurality of sub-carriers lie in a frequency band closer to a center frequency of said FM radio channel than a frequency band occupied by said first group of said first plurality of sub-carriers; and said second group of said second plurality of sub-carriers lie in a frequency band closer to a center frequency of said FM radio channel than a frequency band occupied by said first group of said second plurality of sub-carriers.

63. The broadcasting system of claim 61, wherein said exciter further produces a third group of said first plurality of sub-carriers and a third group of said second plurality of sub-carriers; and wherein said modulator modulates said third group of said first plurality of sub-carriers and said third group of said second plurality of sub-carriers with a second complementary punctured convolutional coded version of program material, said second complementary punctured convolutional coded version of program material having a lower code rate than said first complementary punctured convolutional coded version of program material.

64. The broadcasting system of claim 63, wherein said exciter further produces a fourth group of said first plurality of sub-carriers and a fourth group of said second plurality of sub-carriers; and wherein said modulator modulates said fourth group of said first plurality of sub-carriers and said fourth group of said second plurality of sub-carriers with additional data.

* * * * *

UNITED STATES PATENT AND TRADEMARK OFFICE
CERTIFICATE OF CORRECTION

PATENT NO.    : 6,430,227 B1
DATED         : August 6, 2002
INVENTOR(S)   : Brian William Kroeger et al.

It is certified that error appears in the above-identified patent and that said Letters Patent is hereby corrected as shown below:

Title page,
Item [56], References Cited, OTHER PUBLICATIONS,
"W. Kroeger et al.," reference "Compatability" should read -- Compatibility --.

Column 1,
Line 22, "5,465,39" should read -- 5,465,396 --.

Column 2,
Line 25, "lower'sidebands" should read -- lower sidebands --.

Column 4,
Line 53, "tunings" should read -- tuning --.

Column 5,
Line 26, "Commn." should read -- Comm. --.

Column 7,
Line 26, "+200 kHz" should read -- ±200 kHz --.

Signed and Sealed this

Sixteenth Day of November, 2004

JON W. DUDAS
*Director of the United States Patent and Trademark Office*